(12) United States Patent
Dong

(10) Patent No.: US 12,255,672 B2
(45) Date of Patent: Mar. 18, 2025

(54) DATA TRANSMISSION METHOD, APPARATUS, DEVICE, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 51 days.

(21) Appl. No.: 17/612,908

(22) PCT Filed: May 23, 2019

(86) PCT No.: PCT/CN2019/088138
§ 371 (c)(1),
(2) Date: Nov. 19, 2021

(87) PCT Pub. No.: WO2020/232700
PCT Pub. Date: Nov. 26, 2020

(65) Prior Publication Data
US 2022/0278699 A1 Sep. 1, 2022

(51) Int. Cl.
*H04B 1/00* (2006.01)
*H04L 5/00* (2006.01)
(52) U.S. Cl.
CPC .......... *H04B 1/005* (2013.01); *H04L 5/0055* (2013.01)
(58) Field of Classification Search
CPC ..... H04B 1/005; H04L 5/0055; H04L 5/0041; H04L 5/0044; H04L 1/0009; H04W 72/51; H04W 72/0453; H04W 84/12; H04W 8/02
See application file for complete search history.

(56) References Cited

U.S. PATENT DOCUMENTS

2015/0026453 A1  1/2015  Liu et al.
2018/0054847 A1  2/2018  Cariou et al.
(Continued)

FOREIGN PATENT DOCUMENTS

CN  102984818 A  3/2013
CN  103813410 A  5/2014
(Continued)

OTHER PUBLICATIONS

International Search Report of PCT/CN2019/088138 dated Feb. 25, 2020 with English translation, (4p).
(Continued)

*Primary Examiner* — Eric Myers
(74) *Attorney, Agent, or Firm* — Arch & Lake LLP; Hao Tan; Shen Wang

(57) ABSTRACT

A data transmission method, an apparatus, a device, and a storage medium are provided. The method includes that: a first device generates a first message frame, where the first message frame carries first capability information, and the first capability information indicates that the first device can support data transmission on at least two frequency bands at the same time; the first device sends the first message frame; a second device receives the first message frame; the second device generates and sends a second message frame; the first device receives the second message frame, where the second message frame carries second capability information, and the second capability information indicates that the second device can support data transmission on at least two frequency bands at the same time; and the first device sends data on at least two frequency bands according to the first capability information and the second capability information.

14 Claims, 3 Drawing Sheets

(56) References Cited

U.S. PATENT DOCUMENTS

| | | | |
|---|---|---|---|
| 2018/0206174 A1 | 7/2018 | Zhou et al. | |
| 2018/0206284 A1 | 7/2018 | Zhou et al. | |
| 2019/0082373 A1 | 3/2019 | Patil et al. | |
| 2019/0363843 A1* | 11/2019 | Gordaychik | H04L 1/08 |
| 2020/0084302 A1* | 3/2020 | Chu | H04W 80/02 |

FOREIGN PATENT DOCUMENTS

| | | | |
|---|---|---|---|
| CN | 104812088 A | 7/2015 | |
| CN | 106851683 A | 6/2017 | |
| CN | 107852655 A | 3/2018 | |
| CN | 108990027 A | 12/2018 | |
| CN | 109673001 A | 4/2019 | |
| WO | 2014067131 A1 | 5/2014 | |
| WO | 2015187556 A1 | 12/2015 | |
| WO | 2018217901 A1 | 11/2018 | |

OTHER PUBLICATIONS

Edward Au, IEEE 802.11be: Extremely High Throughput, (2p).
Extended European Search Report issued in Application No. 19930106.0, dated Dec. 20, 2022,(8p).
The First CNOA issued in Application No. 201980000900.7, dated Oct. 19, 2022, with English translation,(19p).
Second Office Action issued to Chinese Application No. 201980000900.7 dated May 20, 2023, (8p).
European Patent 1st Office Action issue in Application No. 19930106.0 dated Jan. 2, 2025, (8p).
"Multi-band WLAN Management ED—Darl Kuhn", IPCOM000188555D, Publication dated Oct. 13, 2009, IP.Com, IP.Com INC., (23p).

* cited by examiner

DATA TRANSMISSION METHOD, APPARATUS, DEVICE, AND STORAGE MEDIUM

CROSS-REFERENCE TO RELATED APPLICATION

This application is the U.S. national phase application of International Application No. PCT/CN2019/088138, filed on May 23, 2019, the contents of which are incorporated herein by reference in their entireties for all purposes.

TECHNICAL FIELD

The present disclosure relates to the field of communications, and in particular to a data transmission method, an apparatus, a device, and a storage medium.

BACKGROUND

In the next generation of wireless fidelity (Wi-Fi) technologies, a research scope includes: 320 MHz bandwidth transmission, aggregation and coordination of multiple frequency bands, etc. The proposed vision improves speed and throughput by at least four times compared with the existing Institute of Electrical and Electronics Engineers (IEEE) 802.11ax. Main application scenarios include video transmission, augmented reality (AR), virtual reality (VR), etc.

The aggregation and coordination of multiple frequency bands refer to simultaneous communication between devices on frequency bands of 2.4 GHz, 5.8 GHz, and 6-7 GHz. In addition, the multiple frequency bands can also be millimeter wave frequency bands, such as 45 GHz and 60 GHz frequency bands.

SUMMARY

The present disclosure provides a data transmission method, an apparatus, a device, and a storage medium.

According to a first aspect of the present disclosure, there is provided a data transmission method. The method includes that: a first device generates a first message frame, where first capability information is carried by the first message frame, and the first capability information is used to indicate that simultaneous data transmission on at least two frequency bands is supported by the first device; the first device sends the first message frame; the first device receives a second message frame, where second capability information is carried by the second message frame, and the second capability information is used to indicate that the simultaneous data transmission on the at least two frequency bands is supported by a second device; and the first device sends data on the at least two frequency bands according to the first capability information and the second capability information.

According to a second aspect of the present disclosure, there is provided a data transmission method. The method includes that: a second device receives a first message frame, where first capability information is carried by the first message frame, and the first capability information is used to indicate that simultaneous data transmission on at least two frequency bands is supported by a first device; the second device generates a second message frame, where second capability information is carried by the second message frame, and the second capability information is used to indicate that the simultaneous data transmission on the at least two frequency bands is supported by the second device; the second device sends the second message frame and the second device receives data on the at least two frequency bands according to the first capability information and the second capability information.

According to a third aspect of the present disclosure, there is provided a wireless communication device, and the wireless communication device includes:

a processor and a memory for storing executable instructions of the processor.

Further, the processor, when executing the executable instructions, is configured to perform acts including: generating a first message frame, where first capability information is carried by the first message frame, and the first capability information is used to indicate that simultaneous data transmission on at least two frequency bands is supported by a first device; sending the first message frame; receiving a second message frame, where second capability information is carried by the second message frame, and the second capability information is used to indicate that the simultaneous data transmission on the at least two frequency bands is supported by a second device; and sending data on the at least two frequency bands according to the first capability information and the second capability information.

According to a fourth aspect of the present disclosure, there is provided a data transmission apparatus. The data transmission apparatus includes a processor and a memory for storing executable instructions of the processor. Further, the processor is configured to execute the method according to the second aspect.

According to a fifth aspect of the present disclosure, there is provided a computer-readable storage medium having stored therein at least one instruction, at least one program, a code set or an instruction set, wherein the at least one instruction, the at least one program, the code set or the instruction set is loaded and executed by a processor to implement the data transmission method in any aspect and any implementation thereof described above.

BRIEF DESCRIPTION OF THE DRAWINGS

In order to explain technical solutions in embodiments of the present disclosure more clearly, the following will briefly introduce drawings needed in the description of the embodiments. Obviously, the drawings in the following description are only some embodiments of the present disclosure. For those of ordinary skill in the art, other drawings can be obtained from these drawings without creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In order to make objectives, technical solutions, and advantages of the present disclosure clearer, the following will further describe embodiments of the present disclosure in detail with reference to the drawings.

A communication system and a business scenario described in the embodiments of the present disclosure are intended to explain the technical solutions of embodiments of the present disclosure more clearly, and do not constitute a limitation to the technical solutions provided by the embodiments of the present disclosure. The ordinary technicians in the art know that, with the evolution of the communication system and the emergence of new business scenarios, the technical solutions provided in the embodiments of the present disclosure are equally applied to similar technical issues.

Figure 1:
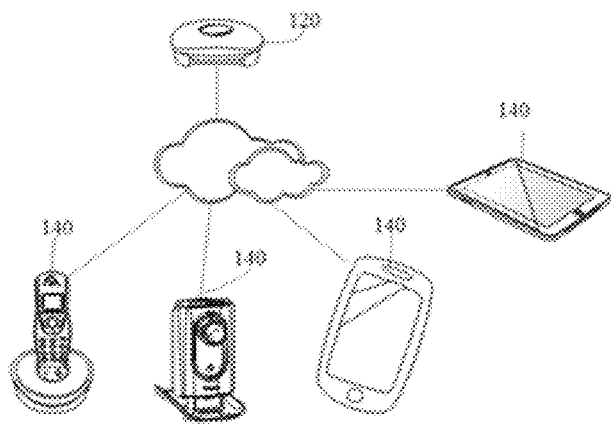
FIG. 1 is a block diagram of a communication system provided by an embodiment of the present disclosure.

FIG. 1 shows a block diagram of a communication system provided by an embodiment of the present disclosure, and the communication system includes: a wireless access point (AP) 120 and a station 140.

The wireless access point 120 is used to provide a wireless access function, and may be a wireless router, a base station with a Wi-Fi function, or the like. Multiple stations 140 can access one wireless access point 120.

The station 140 is used to access the wireless access point 120, and may be an apparatus such as a mobile phone, a tablet, a laptop, an e-book and an industrial machine.

The communication system may be an Institute of Electrical and Electronics Engineers (IEEE) 802.11a/b/g/n/ac/ax/be communication network. In the embodiments of the present disclosure, the communication system being IEEE 802.11 be is taken as an example for description.

The communication system includes two networking forms:

a first form: an underlying wireless network organized based on the AP 120 (also called an infrastructure network or underlying network), which is a wireless network which is created by the AP 120 and many STAs 140 join; characteristics of such network are in that the AP 120 is the center of the entire network, and all communications in the network are forwarded through the AP 120.

In this networking situation, a first device in the present disclosure may be one of the wireless access point 120 and the station 140, and a second device may be the other of the wireless access point 120 and the station 140.

A second form: a wireless network based on an ad-hoc network (also called an ad-hoc network), which is a network composed of only two or more STAs 140 themselves, and there is no AP 120 in the network; such network has a loose structure, and all STAs 140 in the network can communicate directly.

In this networking situation, the first device in the present disclosure may be a first station 140, and the second device may be a second station 140.

Figure 2:
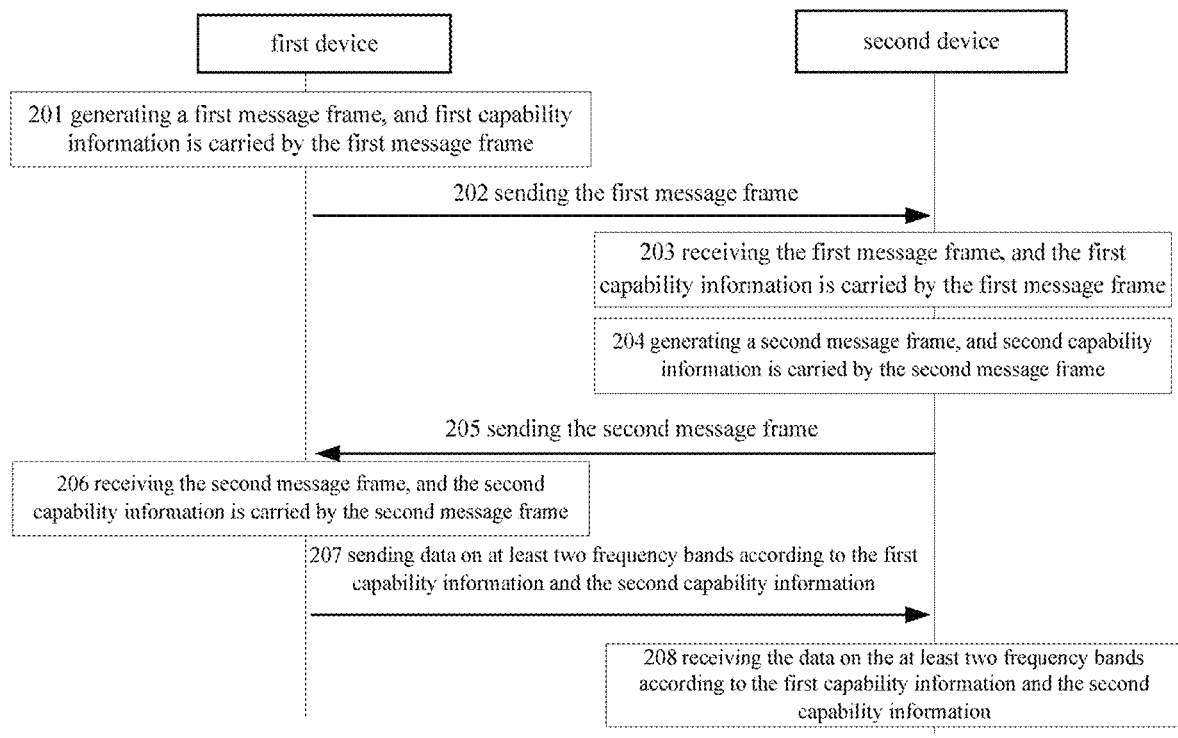
FIG. 2 is a flowchart of a data transmission method provided by an embodiment of the present disclosure.
Figure 3:
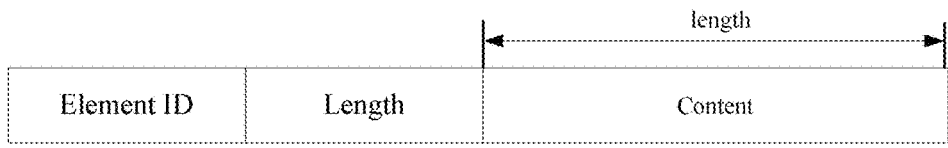
FIG. 3 is a structural block diagram of information elements provided by an embodiment of the present disclosure.

FIG. 2 shows a flowchart of a data transmission method provided by an embodiment of the present disclosure. The method can be applied to the communication system shown in FIG. 1, and the method includes:

In step 201, the first device generates a first message frame, and the first message frame carries first capability information, and the first capability information is used to indicate that simultaneous data transmission on at least two frequency bands is supported by the first device.

The at least two frequency bands include: at least two frequency bands of the 2.4 GHz frequency band, the 5.8 GHz frequency band, and the 6-7 GHz frequency band. In some embodiments, the at least two frequency bands also include other communication frequency bands supported by a Wi-Fi protocol, and these other communication frequency bands may include millimeter wave frequency bands, such as the 45 GHz and 60 GHz frequency bands. In the following embodiments, the 2.4 GHz frequency band is referred to as frequency band A for short, the 5.8 GHz frequency band is referred to as frequency band B for short, and the 6-7 GHz frequency band is referred to as frequency band C for short.

In some embodiments, the first message frame is a multi-band operation request frame.

In some embodiments, when there is a large amount of data needed to be sent by the first device, the first device generates the first message frame.

In step 202, the first device sends the first message frame.

The first device sends the first message frame on a single frequency band. The single frequency band may be a first frequency band, and the single frequency band is a frequency band with which the first device and the second device have established an association.

In step 203, the second device receives the first message frame, and the first message frame carries the first capability information, and the first capability information is used to indicate that the simultaneous data transmission on the at least two frequency bands is supported by the first device.

The second device receives the first message frame on the single frequency band. For example, the second device receives the first message frame on the first frequency band.

In step 204, the second device generates a second message frame, and the second message frame carries second capability information, and the second capability information is used to indicate that the simultaneous data transmission on the at least two frequency bands is supported by the second device.

In some embodiments, the second message frame is a multi-band operation response frame.

In step 205, the second device sends the second message frame.

The second device sends the second message frame on the single frequency band, and the single frequency band may be the first frequency band.

In step 206, the first device receives the second message frame, and the second message frame carries the second capability information, and the second capability information is used to indicate that the simultaneous data transmission on the at least two frequency bands is supported by the second device.

The first device receives the second message frame on the single frequency band. For example, the first device receives the second message frame on the first frequency band.

In step 207, the first device sends data on the at least two frequency bands according to the first capability information and the second capability information.

The first device determines a transmission capability supported by both the first device and the second device according to the first capability information and the second capability information. The data is sent on the at least two frequency bands according to the transmission capacity supported by both the first device and the second device.

In some embodiments, the data is sent on the at least two frequency bands according to an optimal transmission capability supported by both the first device and the second device.

In some embodiments, the at least two frequency bands include the first frequency band and a second frequency band, the first frequency band is a frequency band used to send the first message frame and the second message frame, and the second frequency band is a frequency band different from the first frequency band.

In step 208, the second device receives the data on the at least two frequency bands according to the first capability information and the second capability information.

The second device determines a transmission capability supported by both the first device and the second device according to the first capability information and the second capability information. The data is received on the at least two frequency bands according to the transmission capacity supported by both the first device and the second device.

In some embodiments, the data is received on the at least two frequency bands according to the optimal transmission capability supported by both the first device and the second device.

The first capability information and the second capability information may be the same or different.

In some embodiments, the first device supports simultaneous communication on the frequency band A, the frequency band B, and the frequency band C, and the second device supports the simultaneous communication on the frequency band A and the frequency band B. In this case, the first device determines that the frequency band A and the frequency band B are frequency bands supported by both devices, and sends the data on the frequency band A and the frequency band B. Correspondingly, the second device simultaneously receives the data on the frequency band A and the frequency band B.

In summary, in the method provided by the embodiments of the present disclosure, the first message frame carrying the first capability information is sent to the second device by the first device, and the second message frame carrying the second capability information is replied to the first device by the second device, and then the first device and the second device transmit the data on the at least two frequency bands according to the first capability information and the second capability information, so that the two devices with different capabilities can simultaneously transmit the data on multiple frequency bands through negotiation, thereby achieving greater transmission rate and throughput.

In the embodiments of the present disclosure, steps executed by the first device can be separately implemented as a data transmission method on the first device side, and steps executed by the second device can be separately implemented as a data transmission method on the second device side.

In some embodiments based on FIG. 2, the first capability information and the second capability information include the following information item: frequency band identifications of the at least two frequency bands.

In some embodiments, the first capability information further includes: at least one of an operating bandwidth supported by the first device, a MCS or key reuse information.

In some embodiments, the second capability information further includes: at least one of the operating bandwidth supported by the second device, the MCS or key reuse acknowledgement information.

The operating bandwidth is at least one of a combination of 20 MHz, 40 MHz, 80 MHz, 80+80 MHz (discontinuous, non-overlapping)/160 MHz (continuous), 160+160 MHz (discontinuous, non-overlapping)/320 MHz.

The key reuse information is used to indicate that an existing key (a key on the first frequency band) is reused for data encryption.

In some embodiments, 8 bits are used to indicate the frequency band and the operating bandwidth. The number of frequency band identifications is the same as the number of frequency bands. Taking the frequency bands including the 2.4 GHz frequency band, the 5.8 GHz frequency band and the 6-7 GHz frequency band as an example, the frequency band identifications occupy the first 3 bits of the 8 bits, and a first bit of the first 3 bits corresponds to the 2.4 GHz frequency band, a second bit corresponds to the 5.8 GHz frequency band, and a third bit corresponds to the 6-7 GHz frequency band.

When a value of the first bit is 1, it means that the communication on the 2.4 GHz frequency band is supported, and when the value of the first bit is 0, it means that the communication on the 2.4 GHz frequency band is not supported. When a value of the second bit is 1, it means that the communication on the 5.8 GHz frequency band is supported, and when the value of the second bit is 0, it means that the communication on the 5.8 GHz frequency band is not supported. When a value of the third bit is 1, it means that the communication on the 6-7 GHz frequency band is supported, and when the value of the third bit is 0, it means that the communication on the 6-7 GHz frequency band is not supported.

The last 5 bits of the 8 bits are used to indicate the operating bandwidth. A fourth bit corresponds to 20 MHz, a fifth bit corresponds to 40 MHz, a sixth bit corresponds to 80 MHz, a seventh bit corresponds to 80+80 MHz (discontinuous, non-overlapping)/160 MHz (continuous), and an eighth bit corresponds to 160+160 MHz (discontinuous, non-overlapping)/320 MHz. When a bit value is 1, it means that the corresponding operating bandwidth is supported, and when the bit value is 0, it means that the corresponding operating bandwidth is not supported.

In some embodiments, each of the foregoing information items is represented by an information element (IE). The IE is a component of a frame (such as a management message frame) with a variable length. In some embodiments, the IE includes an element identification (ID) bit, a length bit, and a content bit with a variable length. The length bit is used to indicate the number of content bits. Each information item among the above-mentioned information items may occupy one IE, or two or more information items may occupy the same IE. The element ID of the IE can be represented by a reserved bit in related art, such as 11-15, 43-49, 50-255, etc.

In an optional embodiment based on FIG. 2, the first message frame is a beacon frame, and the second message frame is an association request frame; or, the first message frame is a probe request frame, and the second message frame is a probe response frame; or, the first message frame is an association request frame, and the second message frame is an association response frame; or, the first message frame is an authentication request frame, and the second message frame is an authentication response frame.

In some embodiments based on FIG. 2, the first device sends the same data frame on the at least two frequency bands; or, the first device sends different data frames on the at least two frequency bands, and the different data frames are obtained after the data to be sent is divided into blocks.

For example, at a first time, a data frame 1 is sent on the frequency band A, a data frame 2 is sent on the frequency band B, and a data frame 3 is sent on the frequency band C; at a second time, a data frame 4 is sent on the frequency band A, a data frame 5 is sent on the frequency band B, and a data frame 6 is sent on the frequency band C; and at a third time, a data frame 7 is sent on the frequency band A, a data frame 8 is sent on the frequency band B, and a data frame 9 is sent on the frequency band C.

Figure 4:
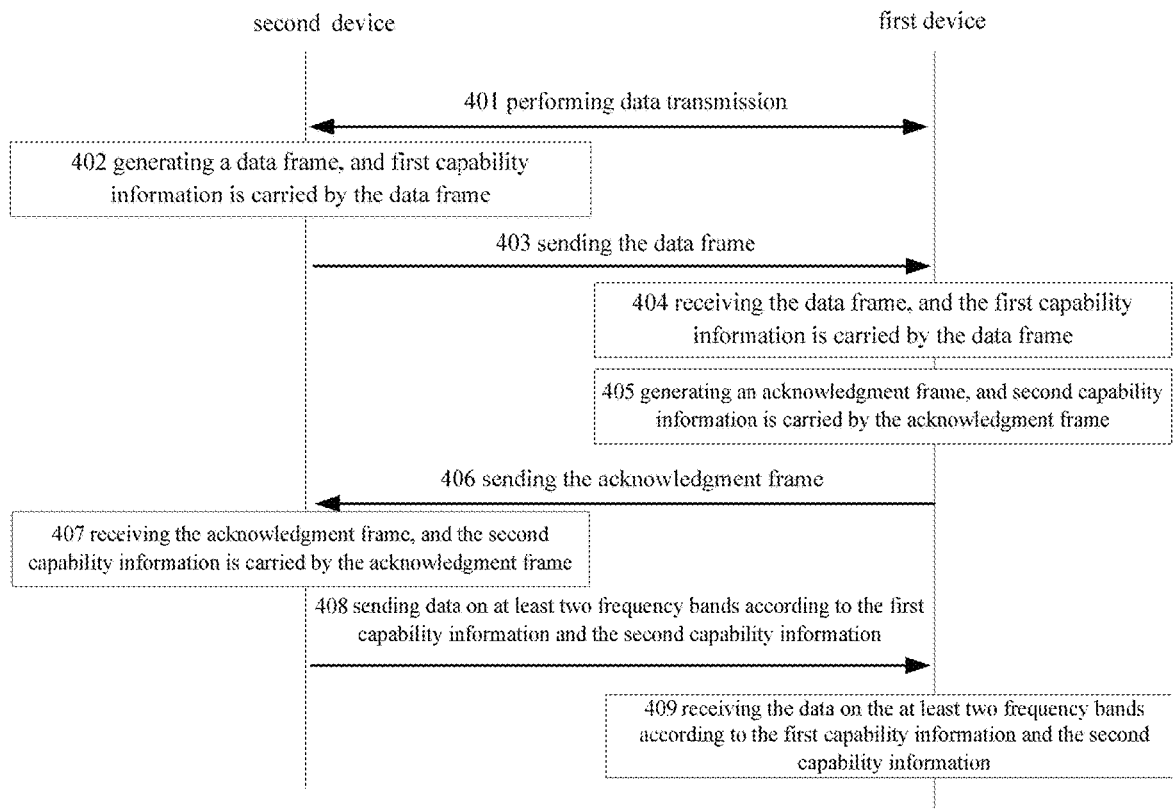
FIG. 4 is a flowchart of a data transmission method provided by another embodiment of the present disclosure.

FIG. 4 shows a flowchart of a data transmission method provided by another embodiment of the present disclosure. The method can be applied to the communication system shown in FIG. 1, and the method includes:

In step 401, the first device and the second device perform data transmission.

In an embodiment, the first device and the second device establish a data transmission connection according to the Wi-Fi protocol, and perform the data transmission on the single frequency band.

In an embodiment, the first device and the second device establish the data transmission connection according to the embodiment shown in FIG. 2, and the first device sends the data to the second device on the multiple frequency bands.

That is, the transmission connection has been established between the first device and the second device, and the second device can send the data frame to the first device.

In step 402, the second device sends the data frame, and a medium access control (MAC) frame header of the data frame carries the second capability information.

When there is a large amount of data to be sent by the second device, the second device generates the data frame, and sends the data frame to the first device.

The MAC frame header of the data frame carries the second capability information. For the related description of the second capability information, reference may be made to the foregoing embodiments.

In some embodiments, the data frame is a physical layer (PHY) protocol data unit (PPDU).

In step 403, the first device receives the data frame, and the media access control (MAC) frame header of the data frame carries the second capability information.

In step 404, the first device sends an acknowledgment frame, and the acknowledgment frame carries the first capability information.

In some embodiments, the acknowledgement frame is an acknowledgement (ACK) feedback frame.

In step 405, the second device receives the acknowledgment frame, and the acknowledgment frame carries the first capability information.

In step 406, the second device sends the data on the at least two frequency bands according to the first capability information and the second capability information.

The second device determines the transmission capability supported by both the first device and the second device according to the first capability information and the second capability information. The data is sent on the at least two frequency bands according to the transmission capacity supported by both the first device and the second device.

In some embodiments, the data is sent on the at least two frequency bands according to the optimal transmission capability supported by both the first device and the second device.

In step 407, the first device receives the data on the at least two frequency bands according to the first capability information and the second capability information.

The first device determines the transmission capability supported by both the first device and the second device according to the first capability information and the second capability information. The data is received on the at least two frequency bands according to the transmission capacity supported by both the first device and the second device.

In some embodiments, the data is received on the at least two frequency bands according to the optimal transmission capability supported by both the first device and the second device.

In summary, in the method provided by the embodiments of the present disclosure, the second device sends the data frame carrying the first capability information to the first device, and the first device replies the acknowledgment frame carrying the second capability information to the second device, and then the second device and the first device transmit the data on the at least two frequency bands according to the first capability information and the second capability information, so that the two devices after having started the data transmission can simultaneously transmit the data on the multiple frequency bands through negotiation, thereby achieving greater transmission rate and throughput.

Figure 5:
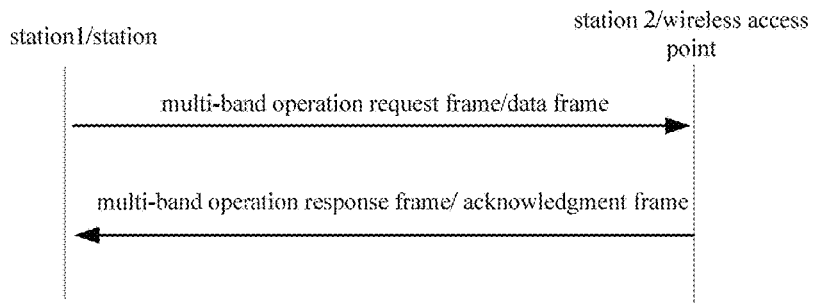
FIG. 5 is a flowchart of a data transmission method provided by another embodiment of the present disclosure.

In combination with the embodiments shown in FIG. 5, in order to enable two devices (STA1+STA2 or STA+AP) to communicate with each other on the multiple frequency bands at the same time, firstly, the two devices need to support a capability of the simultaneous communication on the multiple frequency bands; secondly, if the two devices perform an associated and authenticated connection as well as key negotiation on the single frequency band (such as the first frequency band), they may use the same key to encrypt the data when performing the data transmission on another frequency band; thirdly, before the first data transmission on the multiple frequency bands is performed, the negotiation can be performed in two manners: a. the management message frame is sent between the two devices for negotiation, for example, the first device sends the multi-band operation request frame to the second device, and negotiates the information on performing the multi-band communication in this management message frame (except for an operating frequency band used to send the multi-band operation request message frame itself), such as 5.8 GHz or 6-7 GHz; in addition, the operating bandwidth information for the multi-band communication, such as 20 MHz or 40 MHz, the key reuse information and the MCS of the data transmission are also carried; the second device replies with the multi-band operation response frame to the first device; b. after the data transmission on the single frequency band has started, the data frame (PPDU) sent by the second device to the first device carries the second capability information to indicate to perform the data transmission on the multiple frequency bands, and the first device replies with the acknowledgment (ACK) frame to the second device, and the acknowledgment frame indicates that data transmission will be performed on the multiple frequency bands.

In some embodiments based on FIG. 2 or FIG. 4, in order to ensure that the data transmission on the multiple frequency bands is not interfered, a duration of the subsequent communication to be carried out on the multiple frequency bands is set in the multi-band operation response frame (or a duration field of the MAC frame header of the data frame), but the responder may change the duration. For other stations, a duration value of a network allocation vector (NAV) set by these other stations is based on the subsequent acknowledgment.

The following are apparatus embodiments provided by the embodiments of the present disclosure. For details that are not described in detail in the apparatus embodiments, reference may be made to the above-mentioned corresponding method embodiments.

Figure 6:
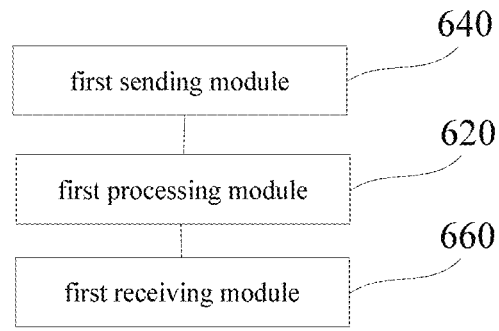
FIG. 6 is a schematic structural diagram of a data transmission apparatus provided by an embodiment of the present disclosure.

FIG. 6 shows a block diagram of a data transmission apparatus provided by an embodiment of the present disclosure. The data transmission apparatus can be implemented as all or part of the first device by means of software, hardware or a combination of the software and the hardware. The apparatus includes: a first processing module 620, a first sending module 640, and a first receiving module 660. The first receiving module 660 and the first sending module 640 may be hardware devices such as radio frequency antennas, and the first processing module 620 may be a hardware device such as a central processing unit or a baseband processor.

The first processing module 620 is configured to generate a first message frame, and first capability information is carried by the first message frame, and the first capability information is used to indicate that simultaneous data transmission on at least two frequency bands is supported by a first device.

The first sending module 640 is configured to send the first message frame.

The first receiving module 660 is configured to receive a second message frame, and second capability information is carried by the second message frame, and the second capability information is used to indicate that the simultaneous data transmission on the at least two frequency bands is supported by a second device.

The first sending module is configured to send data on the at least two frequency bands according to the first capability information and the second capability information.

In some embodiments, the first capability information and the second capability information include the following information item:

frequency band identifications of the at least two frequency bands.

In some embodiments, the first capability information and the second capability information further include at least one of the following information items: an operating bandwidth; a modulation and coding scheme; and key reuse information.

In some embodiments, the information item is represented in a form of an information element.

In some embodiments, the first message frame is a multi-band operation request frame, and the second message frame is a multi-band operation response frame.

In some embodiments, the first message frame is a beacon frame, and the second message frame is an association request frame; or, the first message frame is a probe request frame, and the second message frame is a probe response frame; or, the first message frame is an association request frame, and the second message frame is an association response frame; or, the first message frame is an authentication request frame, and the second message frame is an authentication response frame.

In some embodiments, the first receiving module 660 is configured to receive a data frame, and the second capability information is carried by a MAC frame header of the data frame.

The first sending module 640 is configured to send an acknowledgement frame, and the first capability information is carried by the acknowledgment frame.

The first receiving module 660 is configured to receive the data on the at least two frequency bands according to the first capability information and the second capability information.

Figure 7:
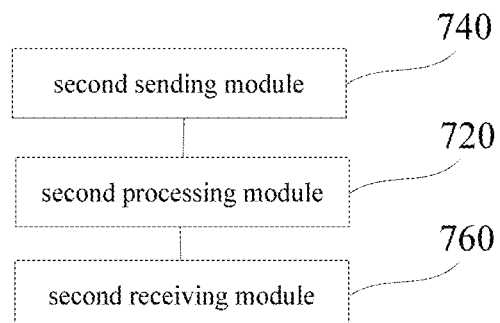
FIG. 7 is a schematic structural diagram of a data transmission apparatus provided by another embodiment of the present disclosure.

FIG. 7 shows a block diagram of a data transmission apparatus provided by an embodiment of the present disclosure. The data transmission apparatus can be implemented as all or part of the second device by means of software, hardware or a combination of the software and the hardware. The apparatus includes: a second processing module 720, a second sending module 740, and a second receiving module 760. The second receiving module 760 and the second sending module 740 may be hardware devices such as the radio frequency antennas, and the second processing module 720 may be a hardware device such as the central processing unit or the baseband processor.

The second receiving module 760 is configured to receive a first message frame, and first capability information is carried by the first message frame, and the first capability information is used to indicate that simultaneous data transmission on at least two frequency bands is supported by a first device.

The second processing module 720 is configured to generate a second message frame, and second capability information is carried by the second message frame, and the second capability information is used to indicate that the simultaneous data transmission on the at least two frequency bands is supported by a second device.

The second sending module 740 is configured to send the second message frame.

The second receiving module 760 is configured to receive data on the at least two frequency bands according to the first capability information and the second capability information.

In some embodiments, the first capability information and the second capability information include the following information item:

frequency band identifications of the at least two frequency bands.

In some embodiments, the first capability information and the second capability information further include at least one of the following information items:

an operating bandwidth;

a modulation and coding scheme; and key reuse information.

In some embodiments, the information item is represented in a form of an information element.

In some embodiments, the first message frame is a multi-band operation request frame, and the second message frame is a multi-band operation response frame.

In some embodiments, the first message frame is a beacon frame, and the second message frame is an association request frame; or, the first message frame is a probe request frame, and the second message frame is a probe response frame; or, the first message frame is an association request frame, and the second message frame is an association response frame; or, the first message frame is an authentication request frame, and the second message frame is an authentication response frame.

In some embodiments, the second sending module 740 is configured to send a data frame, and the second capability information is carried by a MAC frame header of the data frame.

The second receiving module 760 is configured to receive an acknowledgement frame, and the first capability information is carried by the acknowledgment frame.

The second sending module 740 is configured to send the data on the at least two frequency bands according to the first capability information and the second capability information.

Figure 8:
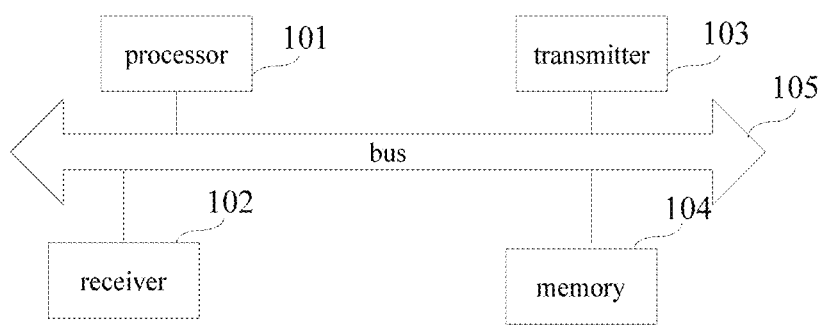
FIG. 8 is a schematic structural diagram of a wireless communication device provided by another embodiment of the present disclosure.

FIG. 8 shows a schematic structural diagram of a wireless communication device provided by an embodiment of the present disclosure. The wireless communication device may be the first device or the second device. The wireless communication device includes: a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as one communication component, and the communication component may be a communication chip.

The memory 104 is connected to the processor 101 through the bus 105.

The memory 104 may be configured to store at least one instruction, and the processor 101 is configured to execute the at least one instruction, so as to implement each step in the foregoing method embodiments.

In addition, the memory 104 can be implemented by any type of volatile or non-volatile storage device or a combination of these storage devices. The volatile or non-volatile storage device includes, but is not limited to: a magnetic disk or an optical disk, an electrically erasable and programmable read-only memory (EEPROM), an erasable programmable read-only memory (EPROM), a static random access memory (SRAM), a read-only memory (ROM), a magnetic memory, a flash memory, a programmable read-only memory (PROM).

An embodiment of the present disclosure also provides a computer-readable storage medium in which at least one instruction, at least one program, a code set or an instruction set is stored, and the at least one instruction, the at least one program, the code set or the instruction set is loaded and executed by a processor to implement each step in the foregoing method embodiments.

The beneficial effects brought by the technical solutions provided by the embodiments of the present disclosure include at least:

the first message frame carrying the first capability information is sent to the second device by the first device, and the second message frame carrying the second capability information is replied to the first device by the second device, and then the first device and the second device transmit the data on the at least two frequency bands according to the first capability information and the second capability information, so that the two devices with different capabilities can simultaneously transmit the data on multiple frequency bands through negotiation, thereby achieving greater transmission rate and throughput.

Those of ordinary skill in the art should know that all or part of the steps described in the above embodiments can be completed through hardware, and may also be completed through related hardware instructed by a program. The program may be stored in a computer-readable storage medium. The storage medium may be a read-only memory, a magnetic disk, an optical disc or the like.

The above descriptions are only preferred embodiments of the present disclosure and are not intended to limit the present disclosure. Any modification, equivalent replacement, improvement and the like within the spirit and principle of the present disclosure shall be included in the protection scope of the present disclosure.

What is claimed is:

1. A data transmission method, comprising:
    establishing, by a first device, a data transmission connection on a first frequency band with a second device;
    generating, by the first device, a first message frame, wherein first capability information is carried by the first message frame, and the first capability information is used to indicate that simultaneous data transmission on at least two frequency bands is supported by the first device; and the at least two frequency bands comprise the first frequency band and a second frequency band different from the first frequency band;
    sending, by the first device on the first frequency band on which the first device and the second device establish the data transmission connection, the first message frame to the second device;
    receiving, by the first device, a second message frame sent by the second device on the first frequency band, wherein second capability information is carried by the second message frame, and the second capability information is used to indicate that the simultaneous data transmission on the at least two frequency bands is supported by the second device; and
    sending, by the first device, data on the at least two frequency bands according to the first capability information and the second capability information; wherein the first capability information and the second capability information comprise following information items:
    frequency band identifications of the at least two frequency bands;
    an operating bandwidth;
    a modulation and coding scheme (MCS); and
    key reuse information.

2. The method according to claim 1, wherein the information item is represented in a form of an information element (IE).

3. The method according to claim 1, wherein:
    the first message frame is a multi-band operation request frame, and the second message frame is a multi-band operation response frame.

4. The method according to claim 1, wherein:
    the first message frame is a beacon frame, and the second message frame is an association request frame;
    the first message frame is a probe request frame, and the second message frame is a probe response frame;
    the first message frame is an association request frame, and the second message frame is an association response frame; or the first message frame is an authentication request frame, and the second message frame is an authentication response frame.

5. The method according to claim 1, wherein
the second message frame is a data frame, and the second capability information is carried by a medium access control (MAC) frame header of the data frame;
the first message frame is an acknowledgment frame, and the first capability information is carried by the acknowledgment frame; and
the method further comprises:
receiving, by the first device, data on the at least two frequency bands according to the first capability information and the second capability information.

6. A data transmission method, comprising:
establishing, by a second device, a data transmission connection on a first frequency band with a first device;
receiving, by the second device on the first frequency band on which the first device and the second device establish the data transmission connection, a first message frame sent by the first device, wherein first capability information is carried by the first message frame, the first capability information is used to indicate that simultaneous data transmission on at least two frequency bands is supported by the first device, and the at least two frequency bands comprise the first frequency band and a second frequency band different from the first frequency band;
generating, by the second device, a second message frame, wherein second capability information is carried by the second message frame, and the second capability information is used to indicate that the simultaneous data transmission on the at least two frequency bands is supported by the second device;
sending, by the second device on the first frequency band, the second message frame to the first device; and
receiving, by the second device, data on the at least two frequency bands according to the first capability information and the second capability information; wherein
the first capability information and the second capability information comprise following information items:
frequency band identifications of the at least two frequency bands;
an operating bandwidth;
a modulation and coding scheme; and
key reuse information.

7. The method according to claim 6, wherein the information item is represented in a form of an information element (IE).

8. The method according to claim 6, wherein:
the first message frame is a multi-band operation request frame, and the second message frame is a multi-band operation response frame.

9. The method according to claim 6, wherein:
the first message frame is a beacon frame, and the second message frame is an association request frame;
the first message frame is a probe request frame, and the second message frame is a probe response frame;
the first message frame is an association request frame, and the second message frame is an association response frame; or
the first message frame is an authentication request frame, and the second message frame is an authentication response frame.

10. The method according to claim 6, wherein
the second message frame is a data frame, and the second capability information is carried by a medium access control (MAC) frame header of the data frame;
the first message frame is an acknowledgment frame, and the first capability information is carried by the acknowledgment frame; and
the method further comprises:
sending, by the second device, the data on the at least two frequency bands according to the first capability information and the second capability information.

11. A data transmission apparatus, comprising:
a processor; and
a memory for storing executable instructions of the processor;
wherein, the processor, when executing the executable instructions, is configured to perform acts comprising:
establishing a data transmission connection on a first frequency band with a second device;
generating a first message frame, wherein first capability information is carried by the first message frame, and the first capability information is used to indicate that simultaneous data transmission on at least two frequency bands is supported by the data transmission apparatus; and the at least two frequency bands comprise the first frequency band and a second frequency band different from the first frequency band;
sending, to the second device, the first message frame on the first frequency band on which the data transmission apparatus and the second device establish the data transmission connection;
receiving a second message frame sent by the second device on the first frequency band, wherein second capability information is carried by the second message frame, and the second capability information is used to indicate that the simultaneous data transmission on the at least two frequency bands is supported by the second device; and
sending data on the at least two frequency bands according to the first capability information and the second capability information; wherein
the first capability information and the second capability information comprise following information items:
frequency band identifications of the at least two frequency bands; and
an operating bandwidth;
a modulation and coding scheme; and
key reuse information.

12. The apparatus according to claim 11, wherein the information item is represented in a form of an information element (IE).

13. The apparatus according to claim 11, wherein:
the first message frame is a multi-band operation request frame, and the second message frame is a multi-band operation response frame.

14. A data transmission apparatus, comprising:
a processor; and
a memory for storing executable instructions of the processor;
wherein, the processor is configured to execute the method according to claim 6.

* * * * *